United States Patent [19]

Medney

[11] 4,032,708

[45] June 28, 1977

[54] HIGH VOLTAGE ELECTRICAL TRANSMISSION LINE AND CONDUIT THEREFOR AND METHOD OF MAKING SAME

[76] Inventor: Jonas Medney, 3504 Woodward St., Oceanside, N.Y. 11572

[22] Filed: Mar. 1, 1976

[21] Appl. No.: 662,960

[52] U.S. Cl. .............................. 174/84 R; 174/36; 174/47

[51] Int. Cl.² ......................................... H01R 5/00

[58] Field of Search .......... 174/36, 16 B, 47, 68 C, 174/84 R, 84 S, 102 R, 107; 138/155; 285/234, 231, 149, 238

[56] References Cited

UNITED STATES PATENTS

| | | | |
|---|---|---|---|
| 500,822 | 7/1893 | Strauss | 174/47 X |
| 2,589,876 | 3/1952 | Sesher | 174/84 S X |
| 2,966,539 | 12/1960 | Sears et al. | 174/84 S X |
| 2,991,092 | 7/1961 | MacKay | 174/84 S |
| 3,244,797 | 4/1966 | Watson | 174/84 S |
| 3,467,764 | 9/1969 | Knapp | 174/47 X |
| 3,578,896 | 5/1971 | Lynch | 174/84 R |
| 3,610,947 | 10/1971 | Stephanides et al. | 174/16 B X |
| 3,792,191 | 2/1974 | Perry et al. | 174/84 R |
| 3,914,002 | 10/1975 | Berliner et al. | 174/47 X |
| 3,943,273 | 3/1976 | de Putter | 174/47 X |

Primary Examiner—Arthur T. Grimley
Attorney, Agent, or Firm—Bauer, Amer & King

[57] ABSTRACT

This invention relates to an electrical transmission line and, in particular, to a conduit for underground and underwater high voltage electrical power transmission lines.

A resin bonded filament wound pipe is provided with a coaxial electrically conductive shield layer which is protected by a non-conductive coating. The pipe is generally of the bell and spigot type, and a conductive adhesive is employed in the joint to make the connection between adjacent pipes, and also to complete the electrical connection between the conductive elements in the adjacent sections or pipes. In completing said electrical connection, the electrostatic shielding for the insulation for the pipe is effectively established. A transmission line is supported within the pipe.

12 Claims, 4 Drawing Figures

HIGH VOLTAGE ELECTRICAL TRANSMISSION LINE AND CONDUIT THEREFOR AND METHOD OF MAKING SAME

BACKGROUND OF THE INVENTION

For economic and reliability considerations electrical energy generating plants in geographically large areas are being organized into single power pools. It is essential that power be transmitted efficiently and, to this end, the transmission voltages have been increasing over recent years so that a potential of the order of 345-KV is not uncommon and consideration is being given to 1,000-KV and even higher potential lines. Such lines, because of ecological, reliability and physical site problems, are preferably buried underground and cross rivers underwater.

The ultrahigh-voltage lines hum and crackle even louder than do the conventional transmission circuits. Noise levels of up to 60 decibels, comparable to city traffic, have been recorded under them.

The electric fields around the lines are strong enough so that if a person underneath one touches a sizable metal surface, such as the side of a vehicle, he can receive a pronounced shock. Engineers say there is no way of insulating overhead wires to prevent such leakage.

The lines carry alternating current, oscillating at the standard rate of 60 cycles a second. It is these fluctuations, combined with the strength of the current, that are thought to have harmful physiological effects.

Accordingly, there is a trend to install such lines underground in pipes. In a typical 345-KV gas-insulated system, a 6-in.-diameter conductor is centered (by spacers) inside an 18-in.-diameter aluminum tube. The gas, usually $SF_6$ under moderate pressure, is pumped in to fill the empty space. It fully insulates the conductor from the outer tube, so that the tubes can be put side by side. The commonly used high tension conductors of bare metal would have to be 10 feet apart.

The present invention contemplates an outer conduit which will contain the transmission line, protect it, provide electrostatic shielding, permit the inclusion of cooling oil or gas and be corrosion resistant.

BRIEF SUMMARY OF THE INVENTION

A resin bonded filament wound pipe is provided with a coaxial electrically conductive shield layer which is protected by a non-conductive coating. The pipe is generally of the bell and spigot type and a conductive adhesive is employed in the joint to make the connection between adjacent pipes and also to complete the electrical connection between the conductive elements in the adjacent sections or pipes. In completing said electrical connection, the electrostati shielding for the insulation for the pipe is effectively established. A transmission line is supported within the pipe.

Accordingly, it is an object of this invention to provide an improved high voltage transmission line.

Another object of this invention is to provide an improved conduit for high voltage transmission lines.

Still another object of this invention is to provide an electrically non-conductive electrostatically shielded conduit for high voltage transmission lines.

A different object of this invention is to provide an improved method of manufacture of transmission lines and conduits.

These and other objects, features and advantages of the present invention will, in part, be pointed out with particularity and will, in part, become obvious from the following more detailed description of the invention, taken in conjunction with the accompanying drawing, which forms an integral part thereof.

DESCRIPTION OF THE DRAWING

In the various features of the drawing like reference characters designate like parts.

In the Drawing.

DESCRIPTION OF THE PREFERRED EMBODIMENTS

Figure 1:
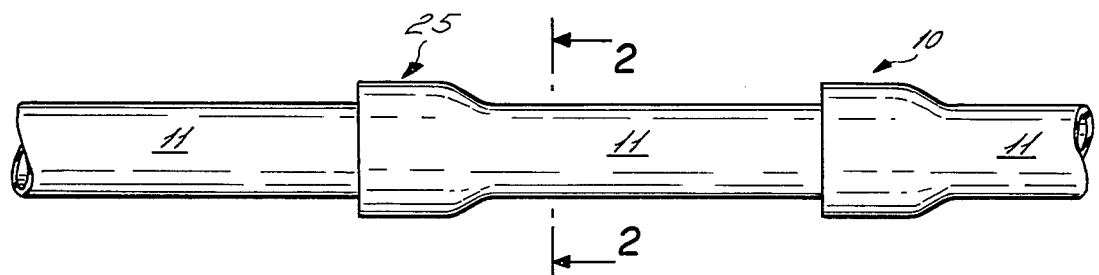
FIG. 1 is an elevational view of a number of sections of pipe joined in a pipeline in accordance with this invention.

Reference is now made to the drawings and, in particular, to FIG. 1 wherein there is shown a pipe system, generally designated 10, formed by an operative arrangement of end to end interconnected pipes 11. To facilitate the connection of the pipe lengths 11, one end of each pipe is provided with a bell shape 25 for receiving the other, unaltered diameter, end of the pipe. In accordance with the present invention, simultaneously with the interconnection of the adjacent pipe lengths 11 in a manner so as to obviate their coming apart inadvertently, the electrical continuity between adjacent lengths 11 is effectively established to thereby provide electrostatic shielding for the pipe system 10, all as will now be described in detail.

In the preferred form illustrated, each length of plastic pipe 11 has an external insulation covering which includes at least one coaxial layer 14 of an electrically conductive shield material such as a metal layer. In the preferred embodiment shown in FIG. 3, in addition to the shield 14 there is a further electrostatic shield 18. Electrostatic shields 14, 18 are spaced from each other by interposed layers 12 and 16 of an appropriate insulating material such as epoxy resin or the like. Further, as is clearly illustrated, the outer insulating shield 18 has an external protective insulated covering 20. Providing the multi-layer construction consisting of the electrically conductive and non-conductive, or insulating, construction materials, just described, is well within the manufacturing techniques already known, and is described in the patent literature, such as for example, in U.S. Pat. No. 3,860,742.

In providing the insulation construction 12, 14, 16, 18 and 20, just described, there is also provided in accordance with the present invention a selected number of radially oriented electrical conductors 26. In the illustrated embodiment, two such conductors 26 are provided. It will be specifically noted that these conductors establish electrical contact, as at the junctions individually and collectively designated 27, with the electrically conductive layers 14 and 18. The electrical connections 27 provided by the conductors 26 may be achieved by the so-called "plated through" technique, which is commonly used in printed circuit boards.

As already noted, the outer insulation construction is identical for each of the pipe lengths 11 but one end, namely that designated 25, of each pipe length 11, also as already noted, is appropriately provided with a bell shape so as to effectively receive within said shape the opposite end of the pipe length 11, which essentially still retains its unaltered cylindrical shape.

To facilitate the telescoping together of the unaltered end 20 of pipe 11, which for convenience may be referred to as the spigot end of the pipe, within the bell end 25 thereof, these ends are appropriately sized so that when telescoped together there is a slight, optimum minimum clearance 28 therebetween. Stated another way, in fitting together the two pipe lengths 11 a friction fit is not contemplated, nor would it be advisable since it would not permit inclusion of conductive adhesive. Rather, the interfitting of adjacent pipe lengths in accordance with the present invention contemplates a loose fit in which there is an optimum minimum clearance 28. However, in accordance with the present invention, a firm mechanical interconnection is nevertheless achieved inasmuch as there is located in the clearance 28 a conductive adhesive 22 which may be any one of a number of available conductive epoxy resins. One conductive adhesive which has been found effective in practice is "Silpox", a silver epoxy conductive adhesive, commercially available from Starnetics Co., North Hollywood, Calif.

Figure 3:
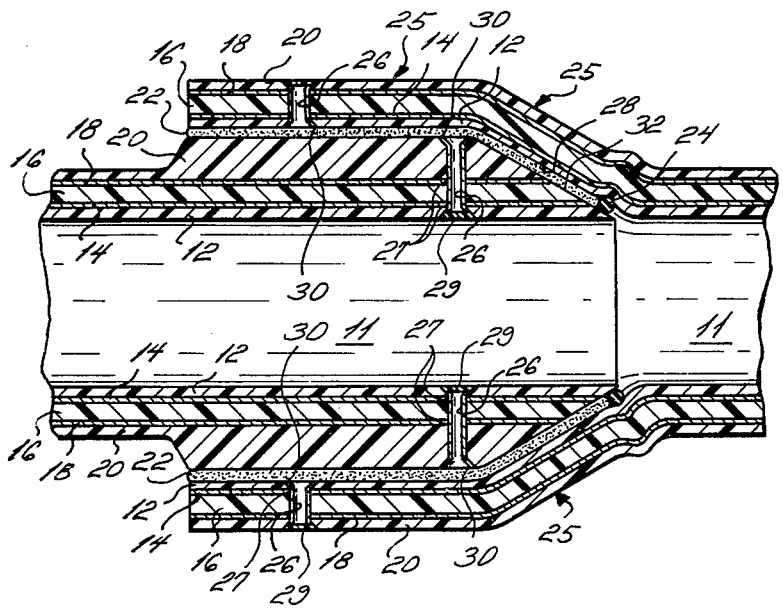
FIG. 3 is a section view taken along line 3—3 of FIG. 2.

As clearly illustrated, perhaps best in FIG. 3, the conductive adhesive 22 completes the adhesive attachment of layer 12 of bell shape 25 with the spigot end 20, thereby completing the mechanical or adhesive interconnection of the adjacent pipe lengths 11. Additionally, the electrically conductive adhesive 22 establishes electrical contact, as at 30, with the radially oriented conductors 26. In this manner, electrical continuity is established between the outer insulation of adjacent pipes 11 and this, it should be readily understood, correspondingly completes the electrostatic shielding for the adjacent pipes 11 and thus also for the pipe system 10. The end of conductors 26 not making connection to the conductive layer is closed by filling with an insulator plastic 29.

As is perhaps best illustrated in FIG. 3, to facilitate the seating of the spigot end 20 within the bell shape 25 the remote or distal portion of this end is tapered, as illustrated, to provide the conical shape 32. This, in an obvious manner, contributes to proper seating of the spigot end 20 within the bell shape 25.

Also, as is perhaps best shown in FIG. 3, in order to prevent flow of the adhesive 22 into the interior of the insulation, and thus in contact with the pipes 11 or even in contact with the high voltage cables 5 or the like which it is contemplated will be threaded through the hollow pipes 11, use is advantageously made of a sealing or "0" ring 25 strategically located to seal off the clearance 28, as illustrated.

Figure 4:
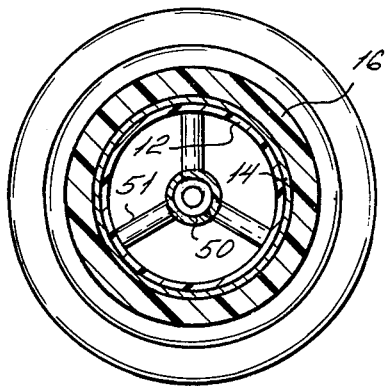
FIG. 4 is a section view similar to FIG. 2 showing an alternative embodiment of the invention.
Figure 2:
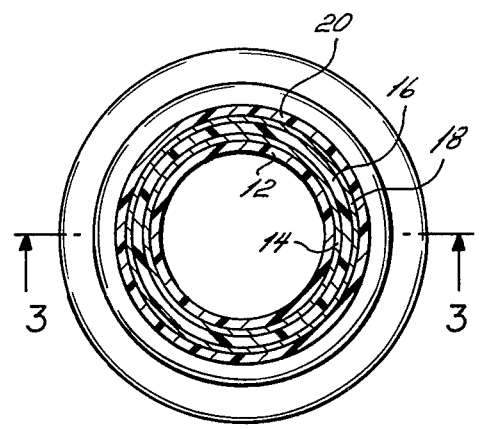
FIG. 2 is a sectional view taken along line 2—2 of FIG. 1.

An electrical conductor which may be stranded copper or aluminum cable, for example, or a tube of these metals serves as an electrical conductor 50 as shown in FIG. 4. The conductor 50 is supported by an electrical insulator spider 51, resin bonded fiberglass, glass, Teflon, ceramic, etc. may be used for this purpose.

The method of manufacture presently contemplated includes the following steps:

1. Coat the mandrel with a suitable resin to form a layer about 0.1mm thick. Optionally, this layer may be formed by winding with glass filament bundles wet with resin.

2. Filament wind a layer of glass filament bundles wet with resin. Preferably this layer should contain not more than 70% glass.

3. Form an electrically conductive sheath coaxially over layer 12 using one of the following methods:
   a. Braiding a woven metal mesh;
   b. Coating with electrically conductive resin;
   c. Plating with metal by chemical or electrolytic deposition;
   d. Covering with a thin metal sheet; or
   e. Spray with molten metal.

4. Filament wind a layer of fiberglass bundles with resin to the desired thickness.

5. Form an electrically conductive sheath coaxially over the layer of fiberglass;

6. Filament wind a layer of fiberglass resin thereover;

7. Drill radial holes through the tube;

8. Metalize the walls of the holes to provide an electrical conduction member to a selected inner or outer wall; and 9. Insulate the conductive member from the unselected wall.

If only one electrostatic shield layer is employed, steps 5 & 6 may be omitted.

Suitable resins for forming the pipe include the catalyzed diglycidyl ether of bisphenol A resin, vinylester, polyester (isophathallic, general purpose, etc.), cycloaliphatic epoxy, novolac epoxy, polyepoxide and diglycidyl ethers of Bisphenol F. The resin should be catalyzed with either appropriate curing agents or promoters.

From the foregoing, it should be readily appreciated that there has been described herein an improved bell and spigot joint 20, 25 in which the non-conductive insulation of adjacent pipes 11 are effectively mechanically interconnected by a conductive adhesive 22 which simultaneously is also effective in completing the electrostatic shielding for the interconnected adjacent pipes. In the description of the above, a latitude of modification, change and substitution is intended, and, in some instances, some features of the invention will be employed without a corresponding use of other features. Accordingly, it is appropriate that the appended claims be construed broadly and in a manner consistent with the spirit and scope of the invention herein.

What is claimed is:

1. In combination, an end-to-end operative arrangement of hollow pipes for housing a high voltage transmission line or the like, each pipe comprising an improved insulator tube containing at least one electrically conductive coaxial layer in said insulator tube serving as an electrostatic shield, said insulator tube of adjacent pipes being disposed in telescoped relation with an optimum minimum clearance therebetween to facilitate said telescoping, said clearance being bounded on one side by an inner surface of an outer insulator tube and on the other side by said outer surface of an inner insulator tube, radially oriented electrically conductive elements in said insulator tubes in electrical contact with said electrostatic shields thereof and communicating with said clearance, and an electrically conductive adhesive in said clearance in contact with said bounding surfaces of said insulators and in contact with said radially oriented conductors, whereby said adhesive simultaneously completes said adhesive interconnection of said insulations of said adjacent pipe and also establishes the electrical continuity between said electrostatic shields of adjacent ones of said insulator tubes.

2. An improved insulator pipe for a high voltage transmission line as defined in claim 1 wherein said insulator tube of one pipe is expanded radially into a bell shape and the insulation of the adjacent pipe is inserted into said bell shape, to thereby form a bell and spigot joint.

3. An improved insulator for a high voltage pipe as defined in claim 2 including a sealed ring disposed in sealing position about one said pipe at the distal end of said clearance so as to prevent said adhesive in said clearance from flowing into said pipes.

4. An improved insulator for a high voltage transmission line as defined in claim 3 wherein each said tubes has additional electrically conductive layers interspaced from each other by non-conductive layers, and wherein each said radially oriented electrically conductive element extends through and in electrical contact with all of said layers.

5. An improved insulation for a high voltage pipe as defined in claim 4 wherein the end of said insulation which is projected within said bell shape is conically shaped so as to facilitate the seating thereof within said bell shape.

6. The apparatus of claim 1 including a transmission line contained therein.

7. The apparatus of claim 1 including a plurality of coaxial conductive layers electrically connected.

8. The apparatus of claim 1 wherein the conductive layer is formed of wire braid.

9. The apparatus of claim 1 wherein the conductive layer is formed of graphite.

10. The apparatus of claim 1 wherein the conductive layer is formed of conductive plastic.

11. The apparatus of claim 1 wherein the conductive layer is formed of sprayed metal.

12. The apparatus of claim 1 wherein the conductive layer is formed of metal foil.

* * * * *